Feb. 26, 1935. J. T. WADE 1,992,848
HYDRAULIC BRAKE
Filed Oct. 6, 1932 2 Sheets-Sheet 1

Inventor
J. T. Wade.
By L. F. Randolph Jr.
Attorney

Feb. 26, 1935.  J. T. WADE  1,992,848
HYDRAULIC BRAKE
Filed Oct. 6, 1932  2 Sheets-Sheet 2
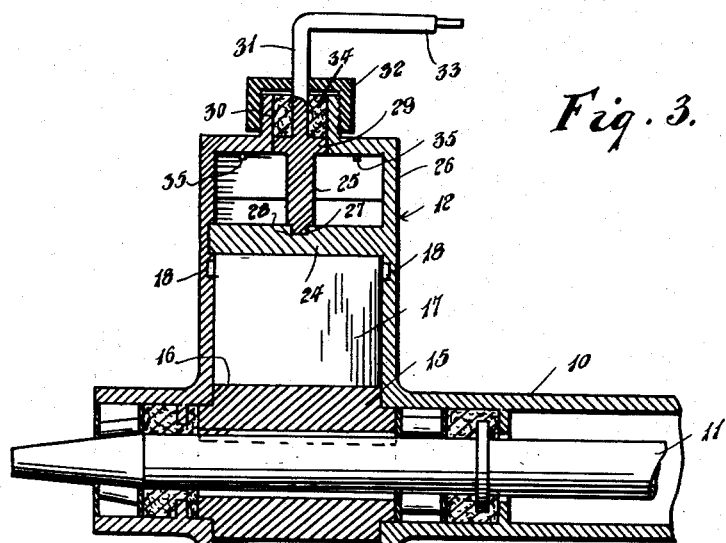
Fig. 3.
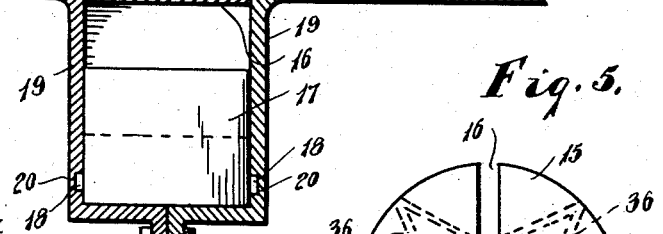
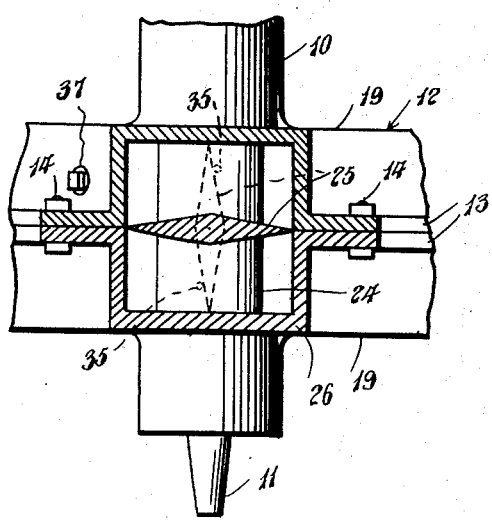
Fig. 4.
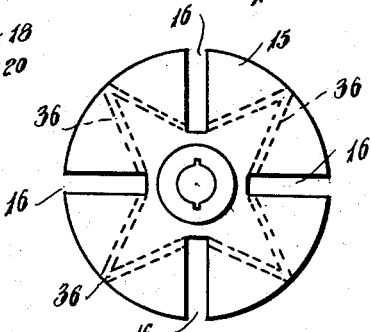
Fig. 5.
Fig. 6
Inventor
J. T. Wade.
By L. F. Rudolph Jr.
Attorney Patented Feb. 26, 1935

1,992,848

UNITED STATES PATENT OFFICE 1,992,848

HYDRAULIC BRAKE

James T. Wade, Ogden, Utah

Application October 6, 1932, Serial No. 636,589

1 Claim. (Cl. 188—90)

The invention relates to hydraulic brakes for motor vehicles and the like, and has for its object the provision of improvements in brakes of such type employing a relatively rotatable casing and piston arranged concentrically of one another, the piston being provided with a plurality of radial vanes operating recesses therein and positively moved radially of the piston by means of lateral projections on the vanes engaging in continuous grooves in the end walls of the casing, said grooves having a portion of their length concentric with the casing and piston to hold the vanes in wiping engagement with the circumferential wall of the casing, and the remainder of the grooves arranged eccentrically to move the vanes from engagement with the wall so as to permit passage of oil or other liquid contained within the casing, freely, and permit relative rotation of the members. Contained within the casing and adapted to limit or stop the flow of the oil or other liquid is a valve or damper, operation of the valve or damper slowing down the relative movement of the parts or stopping the movement entirely, depending on the position of the damper.

Another object of the invention is the provision in a relatively rotatable piston of an hydraulic brake, and provided with radially moving vanes, means to vent the recesses in which the vanes move and contributing to ease of the operation of the brake.

Figure 1:
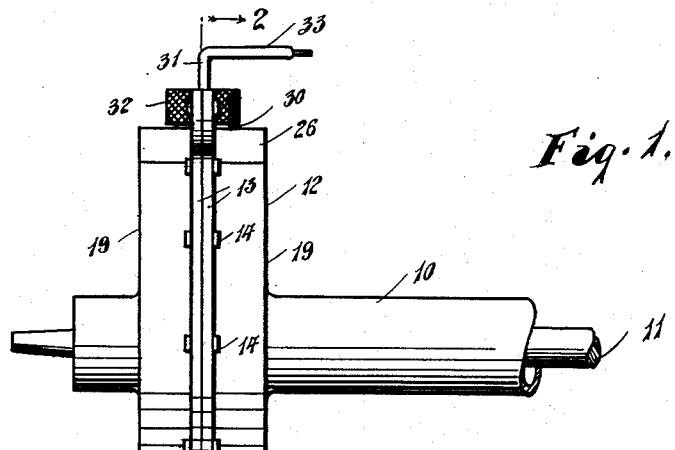
Figure 2:
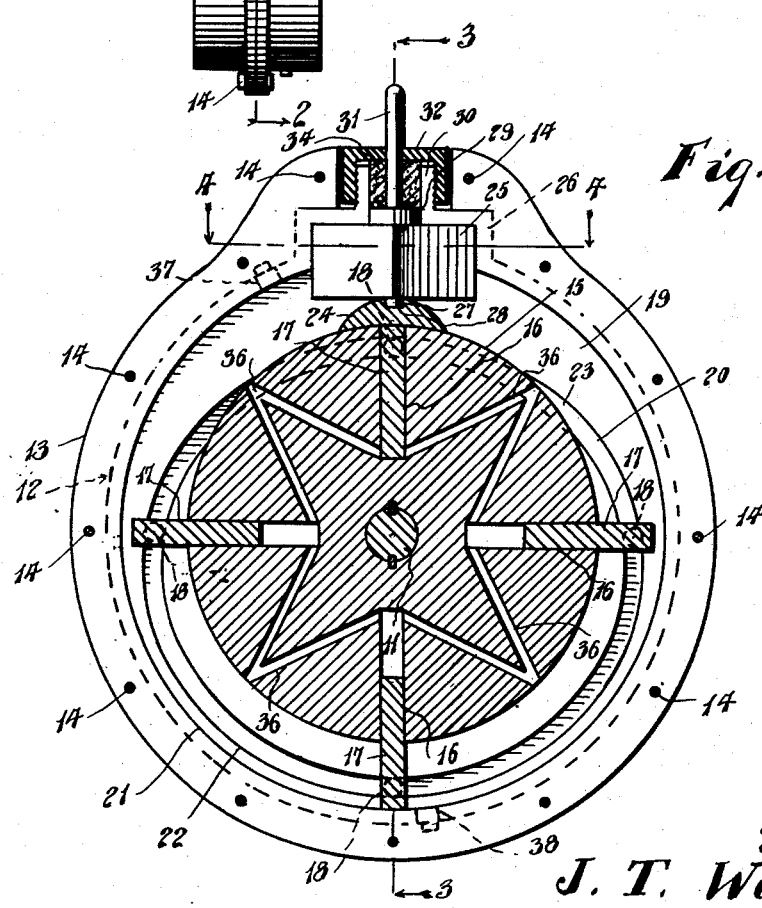

The invention will be described in detail hereinafter and will be found illustrated in the accompanying drawings, in which Figure 1 is a view in elevation of the hydraulic brake showing it applied to the axle and housing of a motor vehicle, shown fragmentarily, Figure 2 is a vertical transverse sectional view on a plane indicated by the line 2—2 of Figure 1, Figure 3 is a vertical longitudinal sectional view on a plane indicated by the line 3—3 of Figure 2, Figure 4 is a sectional detail on a plane indicated by the line 4—4 of Figure 2, Figure 5 is an end view in elevation, on a reduced scale, of the piston, and Figure 6 is a side view in elevation of the piston.

In the drawings similar reference characters are used to designate corresponding parts in all of the views.

The improved hydraulic brake is shown applied to an axle housing 10 in which is rotatably mounted an axle 11, the casing 12 selected for illustration being shown integral with the housing 10, but obviously may be separately constructed and secured to the housing. The casing 12 is formed in two sections, having abutting flanges 13 that are secured together by means of bolts and nuts 14.

Keyed to the axle 11 is a piston 15 having a plurality of slotted recesses 16 arranged radially of the piston and in which are slidably mounted vanes 17. Each of the vanes 17 is provided with lateral projections 18, and the end walls 19 of the casing 12 are provided with continuous grooves 20 to receive the pins or projections 18. Substantially one-third of the grooves 20 are parallel to the circumferential wall 21 of the split casing 12 as shown at 22, while the remainder of the grooves as shown at 23 is eccentric to the circumferential wall 21 and the axle 11 and piston 13 so as to provide a space for movement of the oil or other liquid contained within the casing when the brake is unapplied, it being apparent that rotation of the axle 11 and the piston 15 will result in the radial reciprocation of the vane 17 and when the vane is in its extreme outer position by engagement of the inner projection 18 in the portions 22 of the grooves 20 the outer edge of the vane will wipe the inner surface of the wall of the casing, while the vane or vanes opposite the eccentric portions of the grooves will be moved inwardly to space the vanes from the walls of the casing and permit movement of the oil or other liquid so as to not retard the rotation of the piston.

An abutment 24 is arranged in the casing and in wiping engagement with the piston 15, and 25 designates a valve or damper rotatably mounted in a housing 26 forming a part of the casing 12, said valve or damper 25 being rotatably supported on the abutment 24 by means of a pin 27 engaging in a recess 28 in said abutment. Said valve or damper is also provided with a reduced extension 29 that rotatably engages a cylindrical extension 30 on the valve housing 26, and has a stem 31 extending through a threaded cap 32 on said extension 30 and provided with an angular arm 33 for operation of the damper or valve. Cap 32 operates also as a packing nut, 34 designating the packing in the cylindrical extension 30.

It will be apparent that when the valve or damper 25 is in the position shown in Figures 2, 3, and 4 of the drawings, that movement of the oil or other liquid in the casing will be unretarded. By moving the valve or damper 25 into the position shown in dotted lines in Figure 4, it will be apparent that the movement of the oil or other liquid in the casing will be stopped, and the brake will be applied. By positioning the valve or damper 25 intermediate of the extreme positions shown and described will more or less retard the movement of the liquid and slow down the relative movement of the parts, the application of the brake being brought about without jar and without wear and tear on the parts.

To limit the movement of the valve or damper 25 to brake applying or closed position there are provided projections or stops 35.

Piston 15 is provided with openings or ducts 36 connecting the inner portions of the slotted recesses 16 with the outer surface of the piston on opposite sides thereof and intermediate of vanes 17. These ducts provide means to create circulation of the fluid in the casing to opposite sides of the vanes and in the recesses 16 so that pressure on the inner and outer ends of the vanes will be equal at all times and they will not be impeded in their inner and outer movement. Also said ducts 36 provide for slightly bleeding the fluid under pressure and thus prevent shock and jar in setting the brake. The casing 12 is provided with a filling opening 37 that is closed by a suitable plug as shown, and has a drain opening 38 that is also closed by a plug as shown.

What is claimed is:—

In a brake, a relatively rotatable cylindrical casing and piston, the casing containing a liquid, the piston having recesses therein, vanes slidably mounted in said recesses, and passages extending from the inner portions of said recesses on opposite sides thereof to the outer surface of the piston intermediate of the vanes to equalize the pressure on the inner and outer ends of said vanes and providing means for bleeding the liquid under pressure to prevent shock in operation.

JAMES T. WADE.